United States Patent [19]
Yasuda

[11] Patent Number: 5,581,467
[45] Date of Patent: Dec. 3, 1996

[54] DISPLACEMENT CORRECTING DEVICE AND METHOD FOR A MACHINE TOOL

[75] Inventor: Shouki Yasuda, Nagoya, Japan

[73] Assignee: Brother Kogyo Kabushiki Kaisha, Nagoya, Japan

[21] Appl. No.: 364,243

[22] Filed: Dec. 27, 1994

[30] Foreign Application Priority Data

Dec. 27, 1993 [JP] Japan .................................. 5-331530

[51] Int. Cl.⁶ .................................................. G06F 19/00
[52] U.S. Cl. .................. 364/474.35; 364/474.18
[58] Field of Search ................... 364/474.01, 474.29, 364/474.34, 474.35, 474.17, 474.18, 474.37; 318/569, 570

[56] References Cited

U.S. PATENT DOCUMENTS 3,970,830  7/1976  White et al. ................... 364/474.29

Primary Examiner—Paul P. Gordon
Attorney, Agent, or Firm—Oliff & Berridge

[57] ABSTRACT

The ratio of executed to skipped measurement movement commands required for actual measurement and a correction value when skipping a measurement movement command are determined and then updated according to past (hysteresis) measurement data. The actual thermal displacement measurement during an executed measurement movement command is performed at a proper rate to improve the machining efficiency of an NC machine tool and minimize an error due to the correction.

27 Claims, 17 Drawing Sheets

| M | n | ε (mm) | δ (mm) | Δε (mm) |
|---|---|---|---|---|
| 1 | 1 | 0.020 | 0.020 | 0.020 |
| 2 | 2 | 0.018 | 0.038 | 0.018 |
| 3 | 3 | 0.015 | 0.053 | 0.015 |
| 4 | 4 | 0.010 | 0.063 | 0.010 |
| 5 | 5 | 0.008 | 0.071 | 0.008 |
| 6 | 6 | 0.007 | 0.078 | 0.007 |
| 7 | 7 | 0.006 | 0.084 | 0.006 |
| 8 | 8 | 0.006 | 0.090 | 0.006 |
| 9 | 9 | 0.006 | 0.096 | 0.006 |
| 10 | 10 | 0.005 | 0.101 | 0.005 |
| 11 | 11 | 0.005 | 0.106 | 0.005 |
| 12 | 12 | 0.004 | 0.110 | 0.004 |
| 13 | 14 | 0.006 | 0.116 | 0.003 |
| 14 | 16 | 0.004 | 0.120 | 0.002 |
| 15 | 18 | 0.004 | 0.124 | 0.002 |
| 16 | 22 | 0.005 | 0.129 | 0.001 |
| 17 | 26 | 0.004 | 0.133 | 0.001 |

FIG. 4

| COMMAND EXECUTION COUNT (n) | MEASUREMENT MOVEMENT COUNT (M) | MEASUREMENT MOVEMENT | MEASURED THERMAL DISPLACEMENT (mm) (ε) | MEASURED TOTAL THERMAL DISPLACEMENT (mm) (δ) | AVERAGE THERMAL DISPLACEMENT (mm) (Δε) | DETERMINED CORRECTION AMOUNT (mm) |
|---|---|---|---|---|---|---|
| 30 | 25 | EXECUTION | 0.010 | 0.045 | 0.005 | 0.045 |
| 31 | | OMISSION | N/A | N/A | 0.005 | 0.050 |
| 32 | 26 | EXECUTION | 0.008 | 0.053 | 0.004 | 0.053 |
| 33 | | OMISSION | N/A | N/A | 0.004 | 0.057 |

| STEP S100 | STOP OPERATION STOP TIMER |
|---|---|
| STEP S101 | HAS PROGRAM END COMMAND BEEN EXECUTED ? |
| STEP S102 | READ NEXT BLOCK OF NC DATA |
| STEP S103 | IS NEXT BLOCK OF NC DATA A MEASUREMENT COMMAND ? |
| STEP S104 | EXECUTE NEXT BLOCK OF NC DATA |
| STEP S105 | OPERATION STOP TIMER > THERMAL MONITOR STOP TIME ? |
| STEP S106 | INITIALIZE THERMAL MEASUREMENT |
| STEP S107 | REMAINING SKIP COUNT = 0 ? |
| STEP S108 | MEASUREMENT COMMAND COUNT ← MEASUREMENT COMMAND COUNT + 1<br>REMAINING SKIP COUNT ← REMAINING SKIP COUNT - 1<br>TOTAL THERMAL DISPLACEMENT $\delta$ ← TOTAL THERMAL DISPLACEMENT $\delta$ + ESTIMATED CHANGE IN THERMAL DISPLACEMENT $\Delta\varepsilon$ |
| STEP S109 | EXECUTION OF MEASUREMENT AND CORRECTION |
| STEP S110 | UPDATE MEASUREMENT HYSTERESIS DATA TABLE |
| STEP S111 | DETERMINATION OF MEASUREMENT SKIP COUNT, ESTIMATED CHANGE IN THERMAL DISPLACEMENT $\Delta\varepsilon$ |
| STEP S120 | CLEAR AND RESTART OPERATION STOP TIMER |

Fig. 11B

| STEP S200 | ESTIMATED CHANGE IN THERMAL DISPLACEMENT Δε ← MEASURED CHANGE IN THERMAL DISPLACEMENT ε / CURRENT MONITOR COUNT |
|---|---|
| STEP S201 | CHANGE IN TOTAL THERMAL DISPLACEMENT ε > THERMAL MONITOR DISPLACEMENT ? |
| STEP S202 | DECISION POINTER ← CURRENT MEASUREMENT COMMAND COUNT (n) |
| STEP S203 | IS NUMBER OF UPDATING INTERVALS ANALYZED LESS THAN THERMAL MONITOR CONTINUATION COUNT? |
| STEP S204 | SELECT CURRENT UPDATING INTERVAL BASED ON DECISION POINTER VALUE; IS ACTUAL CHANGE IN THERMAL DISPLACEMENT ε FOR CURRENT UPDATING INTERVAL ≤ THERMAL MONITOR DISPLACEMENT? |
| STEP S205 | UPDATING OF MONITOR COUNT IS NOT POSSIBLE, SET NO-UPDATE-POSSIBLE FLAG, RESET UPDATE-POSSIBLE FLAG |
| STEP S206 | UPDATING OF MONITOR COUNT IS POSSIBLE, SET UPDATE-POSSIBLE FLAG |
| STEP S207 | DECISION POINTER ← DECISION POINTER - MONITOR COUNT |
| STEP S208 | UPDATING IS POSSIBLE FOR ALL UPDATING INTERVALS AND INITIAL MEASUREMENT INTERVAL HAS ENDED ? |
| STEP S209 | MONITOR COUNT ← 2 x MONITOR COUNT |
| STEP S210 | REMAINING SKIP COUNT ← MONITOR COUNT - 1 |
| STEP S211 | RETURN TO STEP S101 |
| STEP S220 | MONITOR COUNT > 1 ? |
| STEP S230 | ACTUAL CHANGE IN TOTAL THERMAL DISPLACEMENT ε > Z-AXIS MACHINING ACCURACY ? |
| STEP S231 | MONITOR COUNT ← MONITOR COUNT/2 |
| STEP S232 | INITIALIZE THERMAL MEASUREMENT |
| STEP S233 | GENERATE THERMAL DISPLACEMENT OVERRUN ERROR |

| | |
|---|---|
| Z-AXIS MACHINING ACCURACY (23b) | 0.020 (mm) |
| THERMAL MONITOR DISPLACEMENT (23c) | 0.010 (mm) |
| THERMAL MONITOR CONTINUATION COUNT (23d) | 2 (TIMES) |
| INITIAL THERMAL MEASUREMENT COUNT (23a) | 10 (TIMES) |
| THERMAL MONITOR LIMIT COUNT (23e) | 10 (TIMES) |

FIG. 12

| M | n | ε (mm) | δ (mm) | |
|---|---|---|---|---|
| 1 | 1(1) | 0.020 | 0.020 | INITIAL MEASUREMENT |
| 2 | 2(1) | 0.018 | 0.038 | |
| 3 | 3(1) | 0.015 | 0.053 | |
| 4 | 4(1) | 0.010 | 0.063 | |
| 5 | 5(1) | 0.008 | 0.071 | |
| 6 | 6(1) | 0.007 | 0.078 | |
| 7 | 7(1) | 0.006 | 0.084 | |
| 8 | 8(1) | 0.006 | 0.090 | ISSUED MEASUREMENT COMMAND COUNT n |
| 9 | 9(1) | 0.006 | 0.096 | |
| 10 | 10(1) | 0.005 | 0.101 | |
| 11 | 11(1) | 0.005 | 0.106 | $\delta(11) - \delta(09) = 0.010$ |
| 12 | 12(1) | 0.004 | 0.110 | $\delta(12) - \delta(10) = 0.009$ |
| 13 | 14(2) | 0.006 | 0.116 | |
| 14 | 16(2) | 0.004 | 0.120 | $\delta(16) - \delta(12) = 0.010$ |
| 15 | 18(2) | 0.004 | 0.124 | $\delta(18) - \delta(14) = 0.008$ |
| 16 | 22(4) | 0.005 | 0.129 | |
| 17 | 26(4) | 0.004 | 0.133 | $\delta(26) - \delta(18) = 0.009$ |
| 18 | 30(4) | 0.004 | 0.137 | $\delta(30) - \delta(22) = 0.008$ |
| 19 | 38(8) | 0.006 | 0.143 | |
| 20 | 46(8) | 0.004 | 0.147 | $\delta(46) - \delta(30) = 0.010$ |
| 21 | 54(8) | -0.001 | 0.146 | $\delta(54) - \delta(38) = 0.003$ |
| 22 | 64(10) | 0.000 | 0.146 | |
| 23 | 74(10) | 0.001 | 0.147 | |
| 24 | 84(10) | -0.011★ | 0.136 | |
| 25 | 89(5) | 0.003 | 0.139 | |
| 26 | 94(5) | 0.001 | 0.140 | |
| 27 | 99(5) | 0.000 | 0.140 | $\delta(99) - \delta(89) = 0.001$ |
| 28 | 104(5) | 0.000 | 0.140 | $\delta(104) - \delta(94) = 0$ |
| 29 | 114(10) | -0.001 | 0.139 | ★THERMAL DISPLACEMENT OVER ACCURACY LIMIT |
| 30 | 124(10) | 0.021★ | ★★★★★ | |

PERIODIC MONITOR COUNT

FIG.13

★ : MEASURED THERMAL DISPLACEMENT WHEN MEASUREMENT MOVEMENT IS EXECUTED

☆ : ACTUAL THERMAL DISPLACEMENT WHEN MEASUREMENT IS SKIPPED

● : CORRECTION VALUE ESTIMATED FROM ACTUAL CHANGE IN THERMAL DISPLACEMENT $\varepsilon$

5,581,467

DISPLACEMENT CORRECTING DEVICE AND METHOD FOR A MACHINE TOOL

BACKGROUND OF THE INVENTION

1. Field of the Invention

This invention relates to a displacement correcting device for a numerically controlled (NC) machine tool. More particularly, this invention is drawn to a displacement correcting device and method for determining the rate at which a displacement of the tool in an NC machine tool is optimally measured and correcting the displacement with a minimum measurement error.

2. Description of the Related Art

In a conventional NC machine tool, a main spindle, which retains a tool, is rotated and moved toward and away from a workpiece along a Z-axis, which is perpendicular to the workpiece, according to NC data. The NC machine tool also moves the workpiece relative to the main spindle along X and Y axis, which are perpendicular to the Z axis. Thus, the workpiece is machined into a desired shape according to the NC data. In this conventional NC machine tool, due to operating conditions and temperature changes during execution of the NC data, thermal expansion and/or contraction of the main spindle causes errors in the relative position along the Z axis between the tool and a table on which the workpiece is retained, so that the workpiece cannot be machined with sufficiently high precision. In these circumstances, the displacement along the Z axis is measured and the errors due to thermal expansion and/or contraction are corrected according to the measured displacement.

In a known method for correcting these errors, a measurement movement sequence is performed to detect the displacement of the machine tool. More specifically, in an NC machine tool having a motor control section which moves the table retaining the workpiece and moves a tool head retaining the tool from an original position by a given distance based on received commands, a detector which defines a true origin is located at a position corresponding to the position of the workpiece. The tool is moved to the detector position until it contacts the detector. This movement is known as the measurement movement. The motor control section is locked by a contact signal generated by the detector. A computing section in the NC machine tool resets a machine origin stored in a memory of the NC machine tool, thereby making the machine origin coincident with the true origin. The correction by the measurement movement is executed in response to a measurement movement command contained in the NC data.

In this conventional displacement correcting method described above, because the measurement movement is contained in the NC data, the measurement command must be executed every time it is encountered in the NC data as the NC data is executed by the NC machine tool, even if it is unlikely that any displacement (or a significant amount of displacement) between the true origin and the machine original has occurred. Thus, the time taken during one cycle is unnecessarily extended, reducing the productivity of the NC machine tool.

SUMMARY OF THE INVENTION

This invention thus provides a displacement correcting device for an NC machine tool which actually performs the displacement measurement movement according to the measurement movement commands at an optimal ratio of issued measurement commands to executed measurement movements to thereby reduce the cycle time of the NC machine tool and to improve the machining efficiency of the NC machine tool.

This invention further provides a displacement correcting device for an NC machine tool which performs the displacement correction based on an estimated displacement due to thermal expansion/contraction when the displacement measurement is not performed, to minimize an error due to skipping the displacement measurement movement, thus enabling machining having a higher degree of accuracy.

According to this invention, a displacement correcting device for an NC machine tool is provided, which performs position correction by measuring a displacement in the NC machine tool according to a measurement movement command. The displacement correcting device comprises measurement hysteresis storing means for storing hysteresis data for the measurement of the displacement, extrapolation means for extrapolating the displacement according to the hysteresis measurement data stored in the measurement hysteresis storing means, determining means for determining a skip ratio for skipping execution of the measurement movement command according to the result of the extrapolation means, and control means for performing measurement processing according to the ratio determined by the determining means.

In the displacement correcting device for the NC machine tool according to this invention, the extrapolation of the displacement of the NC machine tool is determined by the extrapolation means according to measurement hysteresis data stored in the measurement hysteresis data storing means. The ratio of skipped movement commands to performed measurement movements is determined by the determining means according to the extrapolation result from the extrapolation means. Then, measurement processing is performed by the control means according to the ratio determined by the determining means, so that the measurement processing is performed and skipped at a proper ratio according to the extrapolated displacement.

Other objects and features of this invention will be more fully understood from the following detailed description and appended claims when taken with the accompanying drawings.

BRIEF DESCRIPTION OF THE DRAWINGS

The preferred embodiments of this invention will be described in detail with reference to the following drawings, wherein:

FIG. 4 shows a memory portion storing a measurement hysteresis data table;

FIG. 6 shows the various data for four measurement cycles and the extrapolation of the correction amount during measurement cycles where the actual displacement measurement is skipped;

FIGS. 10A and 10B are a flowchart showing the operation of the displacement correcting device according to the preferred embodiment of this invention;

FIGS. 11A and 11B are a flowchart showing the operation of a measurement skip count determining section in the displacement correcting device shown in FIGS. 10A and 10B;

FIG. 12 shows exemplary data stored in the second data storage portion 23 shown in FIG. 2;

FIG. 13 is an exemplary measurement hysteresis data table illustrating actual measurement circumstances according to the preferred embodiment of this invention;

DESCRIPTION OF THE PREFERRED EMBODIMENTS

Figure 1:
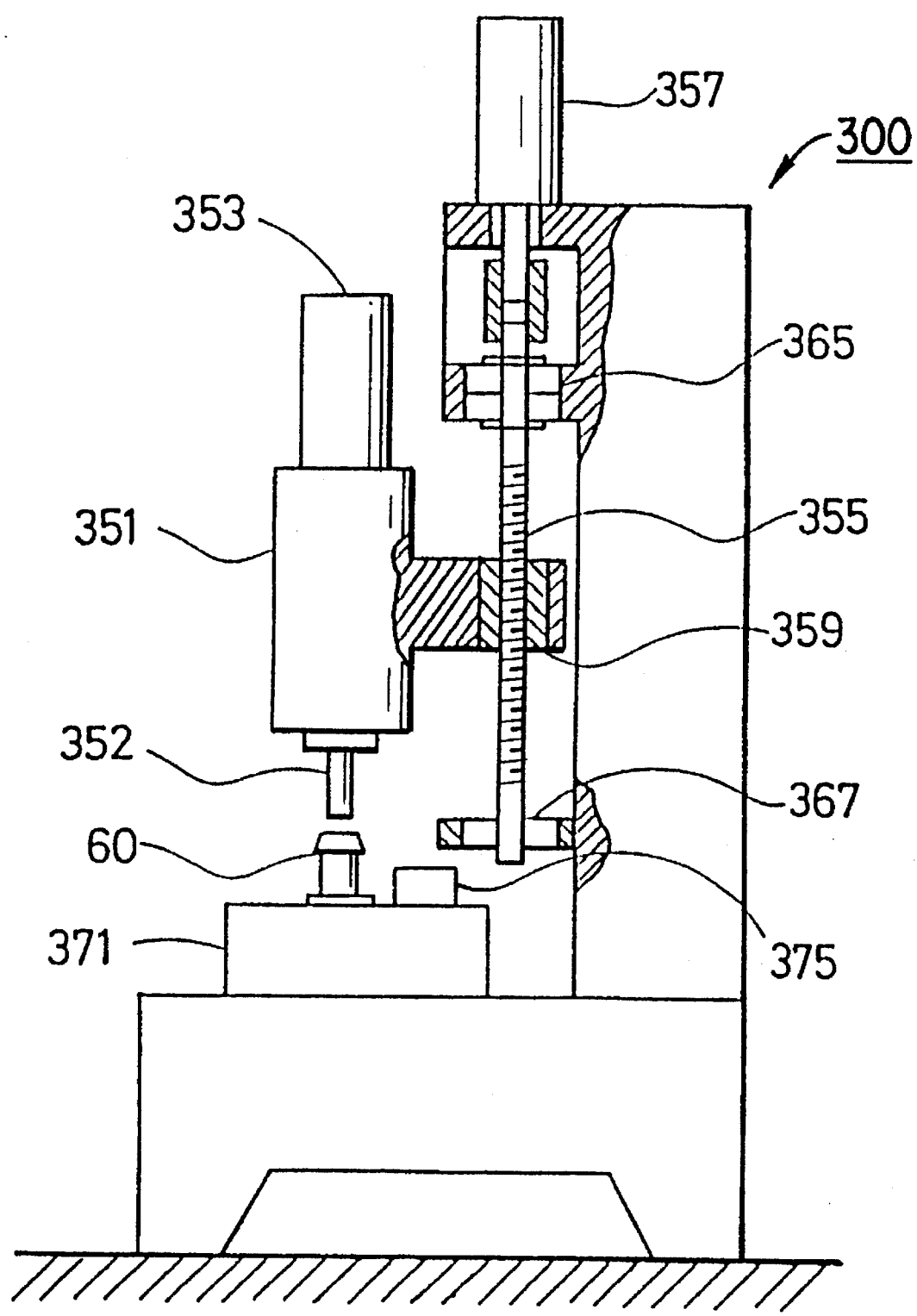
FIG. 1 is a side view of the NC machine tool having the preferred embodiment of the displacement correcting device.

FIG. 1 shows a side view of an NC machine tool 300 having a displacement correcting device for performing displacement correction. The NC machine tool 300 as shown in FIG. 1 includes a working table 371 having an upper surface on which a workpiece 375 is mounted. The working table 371 is movable in two mutually perpendicular horizontal directions, the X and Y directions. The NC machine tool 300 also includes a spindle head 351, a tool 352 which is mounted on the spindle head 351, and a spindle motor 353 which rotates the spindle head 351 and the tool 352.

A Z-axis motor 357 is attached to and rotates a ball screw 355. The ball screw 355 is rotatably supported at its upper end by an upper bearing 365. The upper bearing 365 supports the ball screw 355 so that the ball screw 355 is not able to move axially along the Z axis. The ball screw 355 is rotatably supported at its lower end by a lower bearing 367. The lower bearing 367 supports the ball screw 355 so that the ball screw 355 is able to move axially along the Y axis. Thus, when the ball screw 355 thermally expands or contracts, the ball screw 355 slides within the lower bearing 367 to allow for the expansion or contraction of the ball screw 355. The spindle head 351 is connected to the ball screw 355 by a nut 359. Thus, when the Z-axis motor 357 rotates the ball screw 355, the rotation of the ball screw 355 is translated by the nut 359 into movement of the spindle head 351 along the Z axis.

As the NC machine tool 300 is operated, heat is generated by the spindle motor 353 and the Z-axis motor 357 due to the electrical resistance of these motors and the internal friction of the rotors within the motors. Likewise, heat is also generated by friction between the nut 359 and the ball screw 355, and between the ball screw 355 and the upper and lower bearings 365 and 367. In addition, heat is generated by the tool 352 as it cuts the workpiece 375. The heat generated in the tool 352 and the spindle motor 353, as well as in the spindle head 351 (between the spindle shaft and its supporting bearings) causes thermal expansion and contraction of the tool 352 and the shaft of the spindle 351 as the temperature of these various components varies as the NC machine tool 300 is turned OFF and ON. Likewise, the heat generated in the Z-axis motor 357 and between the ball screw 355, the nut 359, and the bearings 365 and 367 causes thermal expansion and contraction of the ball screw 355 as the temperature of these various components varies as the spindle 351 is raised and lowered. Finally, the heat generated in each subset of the NC machine tool noted above can flow through the nut 359 and the spindle 351 into the ball screw 355 and/or the tool 352 and the shaft of the spindle 351.

To correct for the thermal expansion and contraction of these various components over time, the tool 352 is brought into contact with a detector 60 to measure the displacement of the tool 352. Then, displacement correction according to the preferred embodiment of this invention is performed according to this measured displacement.

Figure 2:
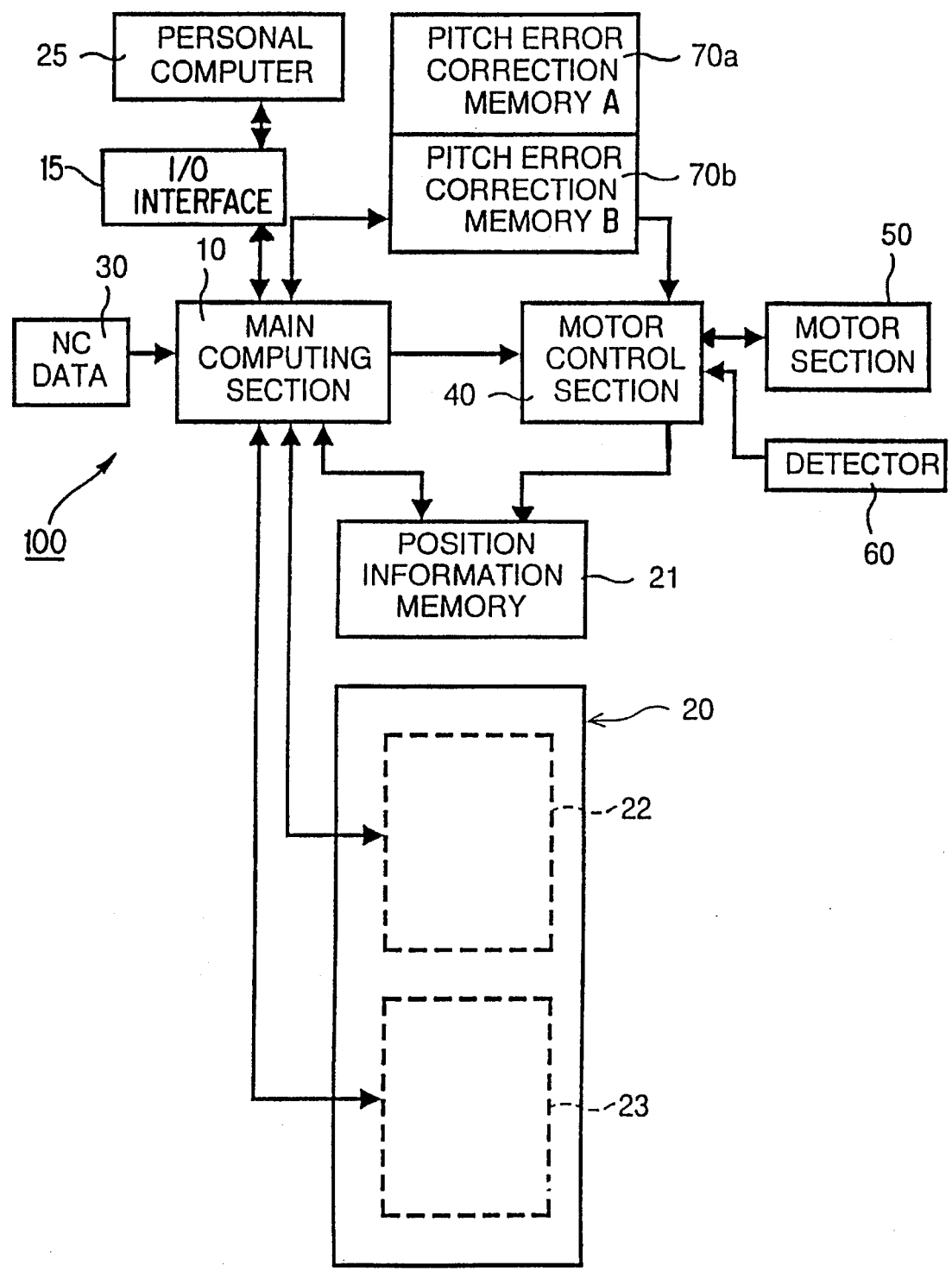
FIG. 2 is a block diagram of the NC machine tool having the preferred embodiment of the displacement correcting device of this invention.

FIG. 2 shows a block diagram of a control system 100 of the NC machine tool having the preferred embodiment of the displacement correcting device. When receiving NC data, a main computing section 10 accesses a pitch correction amount A stored in a pitch error correction memory 70a as an error correction value A. The error correction value A relates to errors arising from conditions other than those associated with a temperature change. The main computing section 10 also accesses a pitch correction amount B stored in a pitch error correction memory 70b as an error correction value B. The error correction value B relates to the errors arising from the thermal displacements in the NC machine tool. Then, the main computing section 10 corrects the command values of the NC data using the error correction values A and B. Based on the corrected command values, the main computing section 10 generates commands and outputs them to a motor control section 40.

The motor control section 40 controls the spindle motor 353 and the Z-axis motor 357, which are parts of the motor section 50 of FIG. 2, based on the commands which move the tool 352 toward the workpiece 375 and rotate the shaft of the spindle 351. The motor section 50 also includes an X motor and a Y motor (not shown) which move the workpiece 375 relative to the spindle 351 in the X and Y directions. The combination of the movements of the spindle 351 along the Z-axis and the workpiece in the X and Y directions machines the workpiece 375. The motion of each motor (the spindle motor 353, the Z-axis motor 357, and the X and Y motors) is input from corresponding encoders (not shown) in the motor section 50 into the motor control section 40. The position data from the encoders of the motor section 50 is stored as position information in a position information memory 21.

The detector 60 is placed at a given position in the NC machine tool 300 and is adjustable in position in the Z direction. When the tool 352 contacts the detector 60, the detector 60 generates a contact signal, which is also output to the motor control section 40.

The NC data 30 contains measurement movement commands. In response to such a measurement movement command, the main computing section 10 controls the motor control section 40 to move the tool 352 until it contacts the detector 60. This movement will be referred to as a measurement movement. The detector 60 generates a contact signal when detecting this contact. The main computing section 10 computes the thermal displacement based on the position data stored in the position memory 21 when the contact signal is received, to update the correction amount B stored in the pitch error correction memory 70b.

The measurement data necessary to perform the displacement correction according to the preferred embodiment of this invention is stored in a measurement data memory 20. This measurement data is generally divided into reset data stored in a reset data storage portion 22 and nonvolatile data which is stored in a second data storage portion 23. The reset data stored in the reset data storage portion 22 is reset whenever the NC machine 30 is turned ON. In contrast, the nonvolatile data stored in the second data storage portion 23 is backed up to a nonvolatile memory when the NC machine 300 is turned OFF and is restored from the nonvolatile memory when the NC machine 300 is turned ON.

Figure 3:
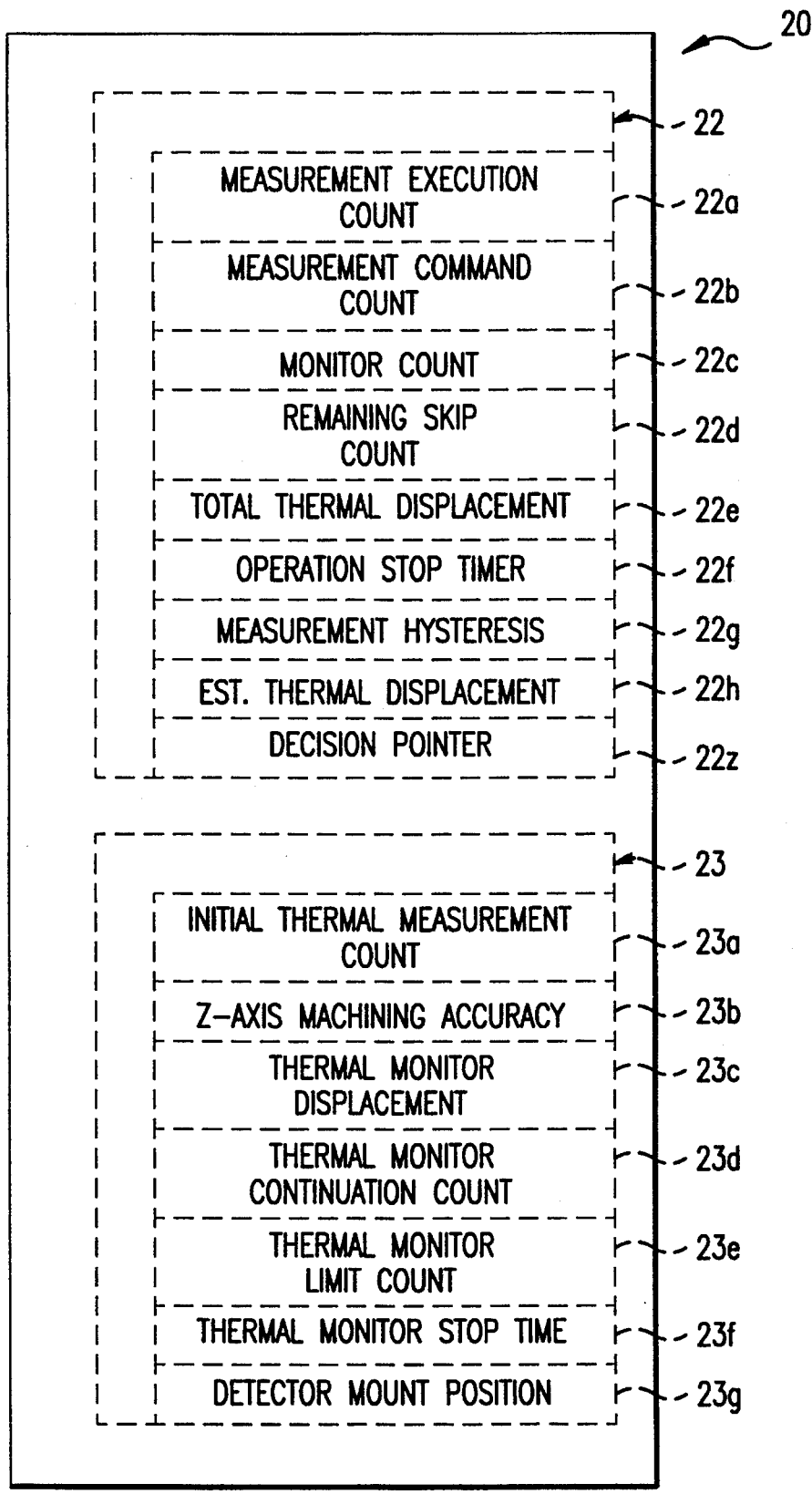
FIG. 3 shows in greater detail the structure of the measurement data memory shown in FIG. 2.

As shown in FIG. 3, the reset data, which is reset by turning ON the power supply, comprises measurement execution count data (M) stored in a measurement execution count portion 22a, which indicates the total number of times the measurement movement has actually been executed. The reset data also includes measurement command count data stored in a measurement command count portion 22b, which indicates the number of times a measurement command has been received, monitor count data stored in a monitor count portion 22c, which indicates the number of times a measurement movement is to be skipped in response to the receipt of a measurement command after a measurement command is executed, remaining skip count data stored in a remaining skip count portion 22d, which indicates the remaining number of times the next received measurement command will be skipped (which itself depends on the monitor count data), thermal displacement data stored in a thermal displacement portion 22e, which indicates the total thermal displacement obtained during the last actual measurement, operation stop timer data stored in an operation stop timer portion 22f, which indicates the elapsed time that the operation of the NC machine tool 300 has been stopped, measurement hysteresis data stored in a measurement hysteresis data table 22g, which indicates, based on the measurement movement count (M), a measurement command count (n), an actual change in thermal displacement ($\epsilon$), which indicates the actual change in total thermal displacement between executed measurement movements, a total thermal displacement ($\delta$), and an estimated change in thermal displacement stored in an estimated thermal displacement portion 22h, which indicates an estimated change in the thermal displacement per issued measurement command estimated from an extrapolation of the past measurement data stored in the memory 20 when the measurement movement command is skipped (i.e, not executed).

The reset data stored in the portions 22a–22h of the reset data portion 22 are reset to the following values when the NC machine tool 300 is turned ON:
measurement execution count data (22a): 0
measurement command count data (22b): 0
monitor count data (22c): 1
remaining skip count data (22d): 0
total thermal displacement data (22e): 0.000 (mm)
operation stop timer data (22f): 0 sec
measurement hysteresis data table (22g): no data
estimated thermal displacement data (22h): 0.000 (mm)

As shown in FIG. 3, the nonvolatile data to be backed up comprises initial thermal measurement count data stored in an initial thermal measurement count portion 23a, which indicates the number of times the measurement command must be initially executed, so the starting unstable thermal displacement is corrected just after the power supply is turned ON, Z-axis machining accuracy data stored in a Z-axis machining accuracy portion 23b, which indicates a maximum change in machining accuracy in the Z-direction below which the actual change in thermal displacement $\epsilon$ must be maintained, thermal monitor displacement data stored in a thermal monitor displacement portion 23c, which indicates a maximum value of the thermal displacement below which the actual change in thermal displacement $\epsilon$ must be maintained during a monitor count interval in order to permit updating the monitor count after the initial measurement interval, thermal monitor continuation count data stored in a thermal monitor continuation count portion 23d, which indicates the number of times that an updating condition (for example, the thermal displacement being less than or equal to the thermal monitor displacement) must be continuously maintained to update the monitor count after the initial measurement, thermal monitor limit count data stored in a thermal monitor limit count portion 23e, which indicates an upper limit of the monitor count value, thermal monitor stop time data stored in a thermal monitor stop timer portion 23f, which indicates the time the operation of the NC machine tool 300 must be stopped in order to have sufficient time to initialize all initial conditions, and detector mount position data stored in a detector monitor position portion 23g, which indicates a mount position of the detector 60 on the table 371.

The information stored in the second data storage portion 23 of the memory 20 shown in FIG. 1 is preset to the following values as shown in FIG. 12:
initial thermal measurement count (23a): 10 (times)
Z-axis machine accuracy (23b): 0.020 (mm)
thermal monitor displacement (23c): 0.010 (mm)
thermal monitor continuation count (23d): 2 (times)
thermal monitor limit count (23e): 10 (times)

As shown in FIG. 2, also connected to the main computing section 10 is an external I/O interface 15 for outputting various signals and data to the outside and inputting external signals and data. The contents of the measurement hysteresis data table 22g, which are shown in FIG. 4, can be fed through the I/O interface 15 to a personal computer 25 or the like by a command from an operation panel (not shown). Accordingly, an operator can know the condition and the tendency of the thermal displacement of the tool 352 and can also optimally set various data and the operating conditions of the NC machine tool 300.

FIG. 4 shows in detail the contents of the measurement hysteresis data table 22g. The first column of the measurement hysteresis data table 22g indicates the measurement movement count M, the second column indicates the corresponding issued measurement command count n, the third column indicates the corresponding actual change in thermal displacement $\epsilon$, the fourth column indicates the corresponding total thermal displacement $\delta$, and the fifth column indicates the estimated change in thermal displacement $\Delta\epsilon$ per issued measurement command. These three displacements are all expressed in millimeters.

As shown in FIG. 4, for the first 12 issued measurement commands (n=12), 12 measurement movements M are performed (M=12). Accordingly, while the total thermal displacement $\delta$ rises from zero, to 0.020 mm after the first measurement command, and then to 0.110 mm after the twelfth measurement command, the actual change in thermal displacement $\epsilon$ drops from 0.020 mm after the first measurement command to 0.004 after the twelfth measurement command. Additionally, the estimated change in thermal displacement per issued measurement command $\Delta\epsilon$ drops from 0.020 mm after the first executed measurement movement, to 0.003 for the skipped 15th issued measurement command, to 0.001 for the skipped 23rd–25th issued measurement commands.

Accordingly, after the twelfth issued measurement command, the next (13th) measurement command is skipped, so that only upon the 14th issued measurement command is the 13th measurement movement is performed. That is, upon receipt of the 13th measurement command, rather than actually executing the measurement command to move the tool 352 to the detector 60 to measure the actual total thermal displacement $\delta$, the actual change in thermal displacement $\epsilon$, and thus the total thermal displacement $\delta$, is estimated by extrapolating the actual change in thermal displacement $\epsilon$ between the 11th and 12th measurement movements measured during the 12th executed measurement movement. Thus, from the actual measurement data from the 12th measurement movement stored in the measurement hysteresis table 22g, the estimated change in thermal displacement $\Delta\epsilon$ is 0.004 mm. This value for estimated change in thermal displacement $\Delta\epsilon$ is added to the total thermal displacement $\delta$ to get a value of 0.114 mm for the total thermal displacement $\delta$ for the skipped 13th issued measurement command. The NC data is then corrected using this estimated value for the total thermal displacement $\delta$.

Then, when the next, or 14th, measurement command being issued, the actual total thermal displacement $\delta$ is measured by performing the 13th measurement movement. The actual total thermal displacement $\delta$ measured in response to the 14th issued measurement command (and 13th executed measurement movement) is 0.116 mm, for a gross actual change in thermal displacement $\epsilon$ of 0.006 or an average actual change in thermal displacement of 0.003 for the 13th and 14th issued measurement commands. This average is then used as the estimated change in thermal displacement $\Delta\epsilon$ for the next skipped measurement command (or commands) until the next executed measurement command.

Thus, as shown in FIG. 4, the 15th issued measurement command is skipped and the estimated change in thermal displacement $\Delta\epsilon$ of 0.003 mm is added to the total thermal displacement $\delta$ of 0.116, to get an estimated total thermal displacement $\delta$ of 0.119. The 16th issued measurement command is performed. The measured total thermal displacement after the 16th issued measurement command (and thus the 14th measurement movement) is 0.120 mm, for a gross actual change in thermal displacement $\epsilon$ of 0.004 mm, or an average actual change in thermal displacement of 0.002 mm for the 15th and 16th issued measurement commands. Thus, after the 16th issued measurement command, the estimated change in thermal displacement $\Delta\epsilon$ is reset to 0.002 mm for the next set of one or more skipped measurement commands.

Figure 5:
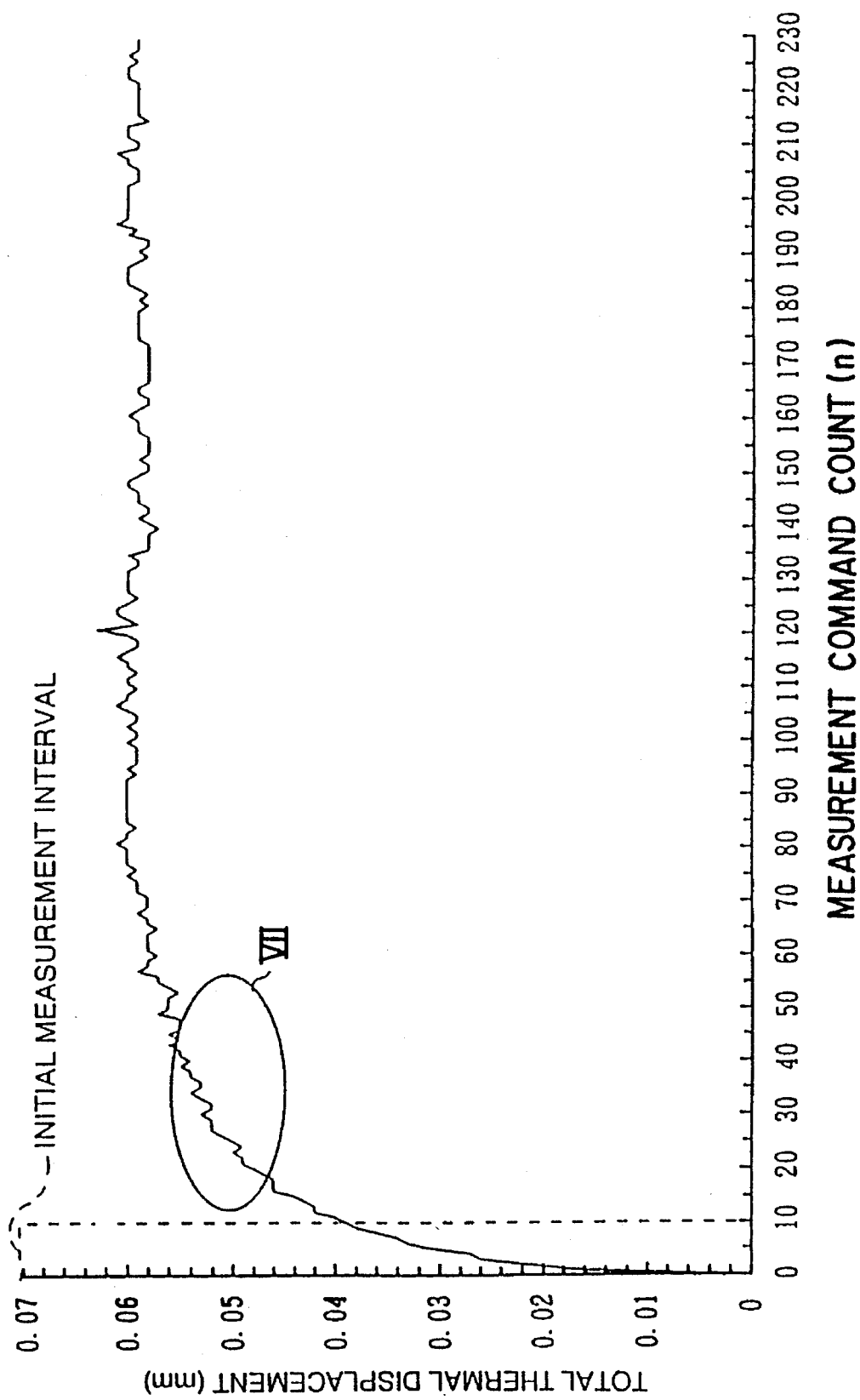
FIG. 5 is a graph of the total thermal displacement as a function of the total number of issued measurement commands.

The principle of the preferred embodiment will now be described with reference to FIGS. 5–7. In this preferred embodiment, an optimal value for the monitor count portion 22c is obtained from an extrapolation of the past measurement hysteresis data. Further, when a measurement movement is skipped, i.e., the measurement command is not executed, the current estimated change in thermal displacement $\Delta\epsilon$ stored in the estimated thermal displacement portion 22h is added to the total thermal displacement $\delta$ stored in the total thermal displacement portion 22e to correct the total thermal displacement $\delta$, thereby realizing higher machining accuracy. As shown in FIG. 5, the change in the thermal displacement is such that the thermal displacement during an initial state (the initial measurement interval) is generally large and unstable. Thereafter, the change in the thermal displacement gradually decreases and becomes stable.

Accordingly, in an initial measurement interval, the measurement movement commands must always be executed. In this preferred embodiment, this initial measurement interval is defined by the initial measurement count data stored in the initial measurement count portion 23a.

Figure 7:
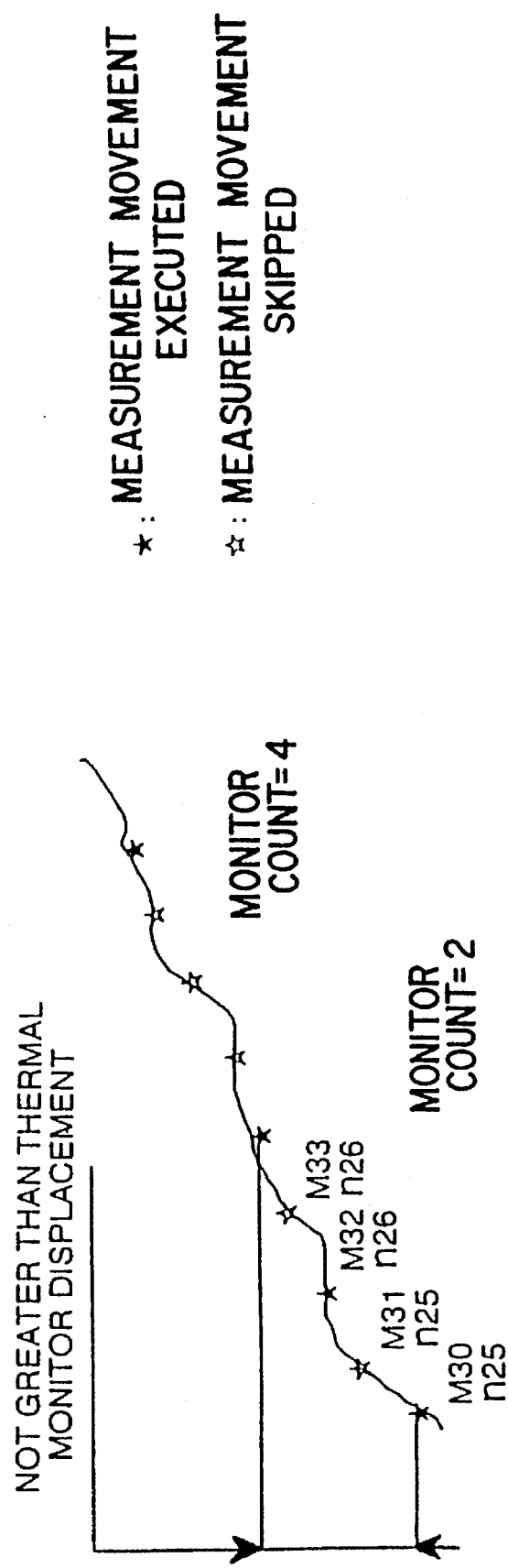
FIG. 7 graphically shows the data shown in FIG. 6.

FIG. 6 shows, in tabular form, the data values for the portion of the graph of FIG. 5 which is shown in greater detail in FIG. 7. In particular, as shown in FIG. 6, the 25th executed measurement movement command is also the 30th issued measurement movement command. In response to the 25th executed measurement movement command, the measured change in thermal displacement $\epsilon$ is 0.010 mm, the measured total thermal displacement $\delta$ is 0.045 mm, and the average, and thus the estimated, change in thermal displacement $\Delta\epsilon$ is 0.005 mm (because the skip count is 2). Thus, the determined correction amount is identical to the measured total thermal displacement $\delta$, and is 0.045 mm. In contrast, in response to the 31st issued measurement movement command, no actual measurements are taken. Thus, there is no new data for the actual total thermal displacement and the actual change in thermal displacement and the corresponding portions of FIG. 6 are marked "N/A" (not applicable). The determined correction amount for the 31st issued measurement movement command is the sum of the previously measured total thermal displacement $\delta$ (0.045 mm) plus the average, or estimated, change in thermal displacement $\Delta\epsilon$ (0.005 mm), and is thus 0.050 mm.

After a number of measurement commands equal to the initial measurement count (or interval) has been received and executed, the value of the monitor count portion 22c is updated as shown in FIG. 7. When the current measurement movement is ended at a certain time, the main computing section 10 updates the measurement hysteresis data table 22g and determines whether to update the value of the monitor count portion 22c.

Before the value of the monitor count can be updated, a number of conditions must first be met. First, an updating interval width is determined. The updating interval width is equal to Cx, where C is a predetermined integer and x is the current value of the monitor count portion 22c. In the preferred embodiment, C is an integer and most preferably, C=2. Then, the change in thermal displacement for a current updating interval is determined. The current updating interval is the interval extending between the current issued measurement command (n) and the Cx-th previous issued measurement command (n-Cx). If the actual change in thermal displacement for the current updating interval is not less than the thermal monitor displacement value stored in the thermal monitor displacement portion (23c), the monitor count is not updated.

Otherwise, to ensure that the actual change in thermal displacement for the current updating interval is not merely coincidentally less than the thermal monitor displacement value, the monitor count is not updated based solely on the comparison for the current updating interval. Rather, the actual changes in thermal displacement for a predetermined number of prior updating intervals are compared to the thermal monitor displacement value. That is, actual change in thermal displacement for y consecutive prior updating intervals must be less than the thermal monitor displacement before the monitor count is updated, where y is the thermal monitor continuation count stored in the thermal monitor continuation portion (23d). This is described in greater detail with respect to FIGS. 11A and 11B.

The estimated change in thermal displacement $\Delta\epsilon$ stored in the estimated thermal displacement portion 22h is determined at the same time the update determination process for the monitor count portion 22c is performed. The value of the estimated thermal displacement portion 22h is obtained by dividing the immediately previous measured actual change in thermal displacement ε by the current value of the monitor count portion 22c. That is, the estimated thermal displacement Δε stored in the change in thermal displacement portion 22h is determined as the average of the previously measured actual change in thermal displacement ε for the previous measurement interval between executed measurement movements (i.e. Δε=ε/x). If the current value of the monitor count portion 22c is updated, the value for the current monitor count portion 22c (i.e., before it is updated) is used when determining the value of the estimated thermal displacement portion 22h. Thus, the estimated thermal displacement Δε is the thermal displacement change per measurement command cycle obtained during the immediately previous measurement interval.

Figure 8:
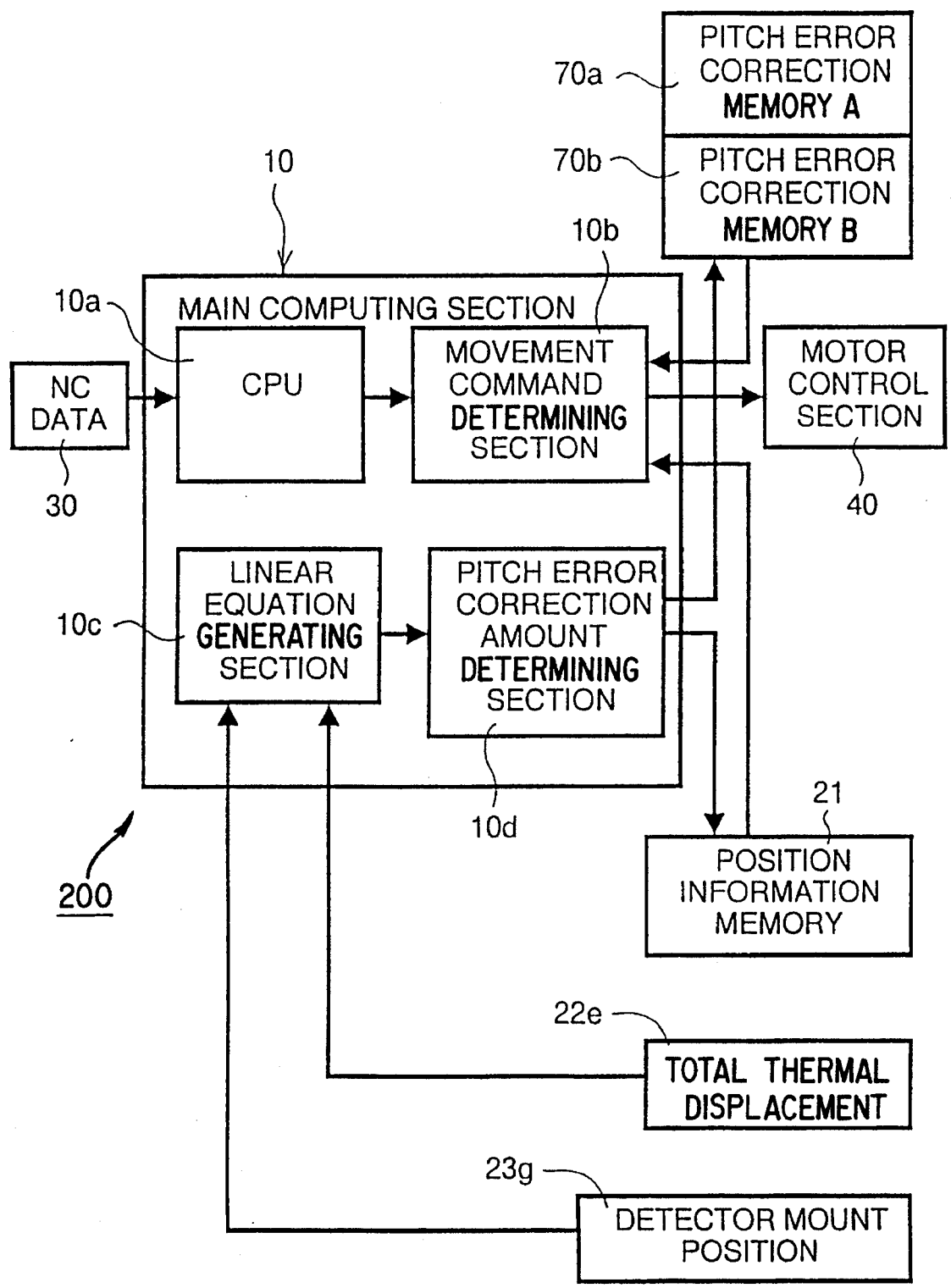
FIG. 8 is a block diagram of the displacement correcting device according to the preferred embodiment of this invention.
Figure 9:
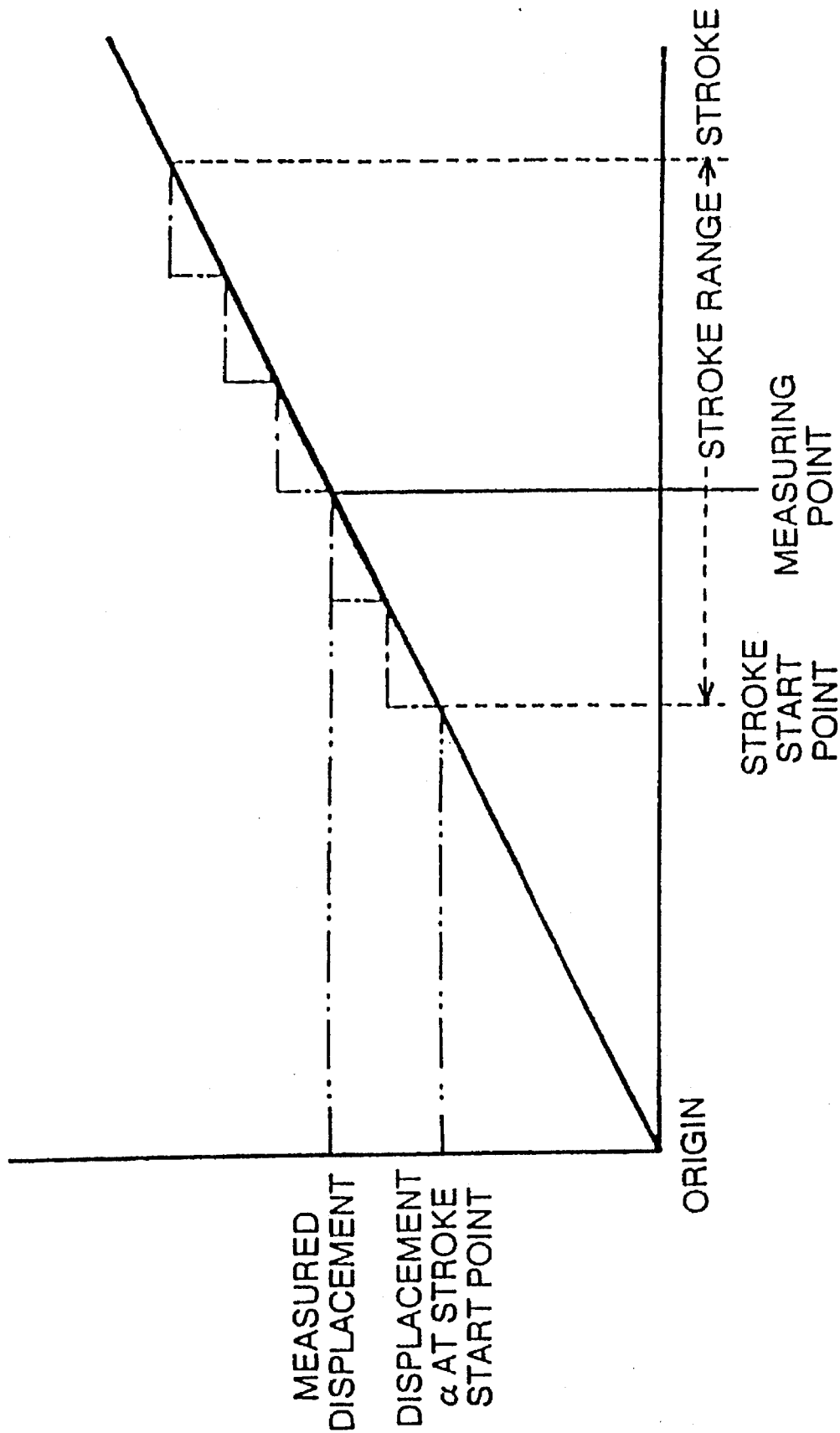
FIG. 9 is a graph showing the relation between a displacement and stroke in pitch error correction.

The updating of the correction amount stored in the pitch error correction B memory 70b will now be described with reference to FIGS. 8 and 9. FIG. 8 shows a displacement correcting device 200 for performing pitch correction according to the preferred embodiment of this invention. As shown in FIG. 8, the main computing section 10 includes a CPU 10a, a movement command determining section 10b for updating a movement command value generated from the CPU 10a based on a pitch error correction amount, a linear equation generating section 10c for generating a linear equation of the displacement according to a measured displacement, and a pitch error correction amount determining section 10d for determining the pitch error correction amount.

The main computing section 10 reads the current total thermal displacement δ from the total thermal displacement portion 22e and the Z-directional detection position information from the detector mount position portion 23g. According to these values, the linear equation creating section 10c generates a straight line in a coordinate system with a fixed point of the ball screw 355 (i.e., the position of the upper bearing 365 shown in FIG. 1) used as the origin, the position of the detector 60 (i.e., the Z-directional distance from the upper bearing 365 to the detector 60) set as an abscissa (or x-axis value), and the measured total thermal displacement as the ordinate (or y-axis value), as shown in FIG. 9. In other words, assuming that the total thermal displacement of the fixed point (as the origin) is zero, a straight line is described according to the current measured total thermal displacement δ. The ball screw 355, which is non-slidably supported at its upper end by the upper bearing 365 and slidably supported at its lower end by the lower bearing 367, expands linearly downwardly along the Z axis when its upper end is fixed. Therefore, the thermal displacement of the spindle head 351 occurs linearly downwardly along the ball screw 355. Accordingly, the total thermal displacement δ can be obtained from the straight line.

The pitch error correction amount determining section 10d determines a pitch error correction amount at regular intervals of 10 mm in the Z direction within a given stroke of the ball screw 355 (i.e., a range of machining by the tool 352). The determined values obtained by the pitch error correction amount determining section 10d are stored in the pitch error correction memory 70b. The pitch correction amounts determined above are shown by the stepped dot-dash line in FIG. 9.

It is generally not necessary to perform accurate position correction in the range from the fixed point of the ball screw 355 (the origin) to a start point of the stroke. This range is not the range of machining by the tool 352, but is the range of movement of the spindle head 351 when exchanging the tool 352. Accordingly, the pitch error correction amount determining section 10d rewrites the information stored in the position information memory 21 by a determined displacement α at the start point of the stroke. That is, the position of the spindle head 351 as a whole is shifted. Alternatively, it is also preferable that the tool 352 may be moved by the distance α in the Z direction with the position information fixed rather than rewriting the information stored in the position information memory 21.

In the machining operation of the NC machine tool, the CPU 10a receives a block of the NC data 30. Based on the received block of NC data, the CPU 10a generates and outputs a movement command value to the movement command determining section 10b. Then, the movement command determining section 10b accesses the correction amounts A and B stored in the pitch error correction memory 70a and the pitch error correction memory 70b corresponding to the movement command value, and adds and/or subtracts these correction amounts to and/or from the movement command value to generate the corrected movement command values. The movement command determining section 10b then outputs the corrected movement command values to the motor control section 40. Then, the motor control section 40 moves the tool 352 according to the input corrected movement command values. As mentioned above, the pitch error correction memory 70b preliminarily stores a pitch error correction amount B for thermal displacement in the NC machine tool, and the pitch error correction memory 70a preliminarily stores a pitch error correction amount A that is preliminarily measured by a conventional method and does not change in response to a temperature change.

Figure 10A:
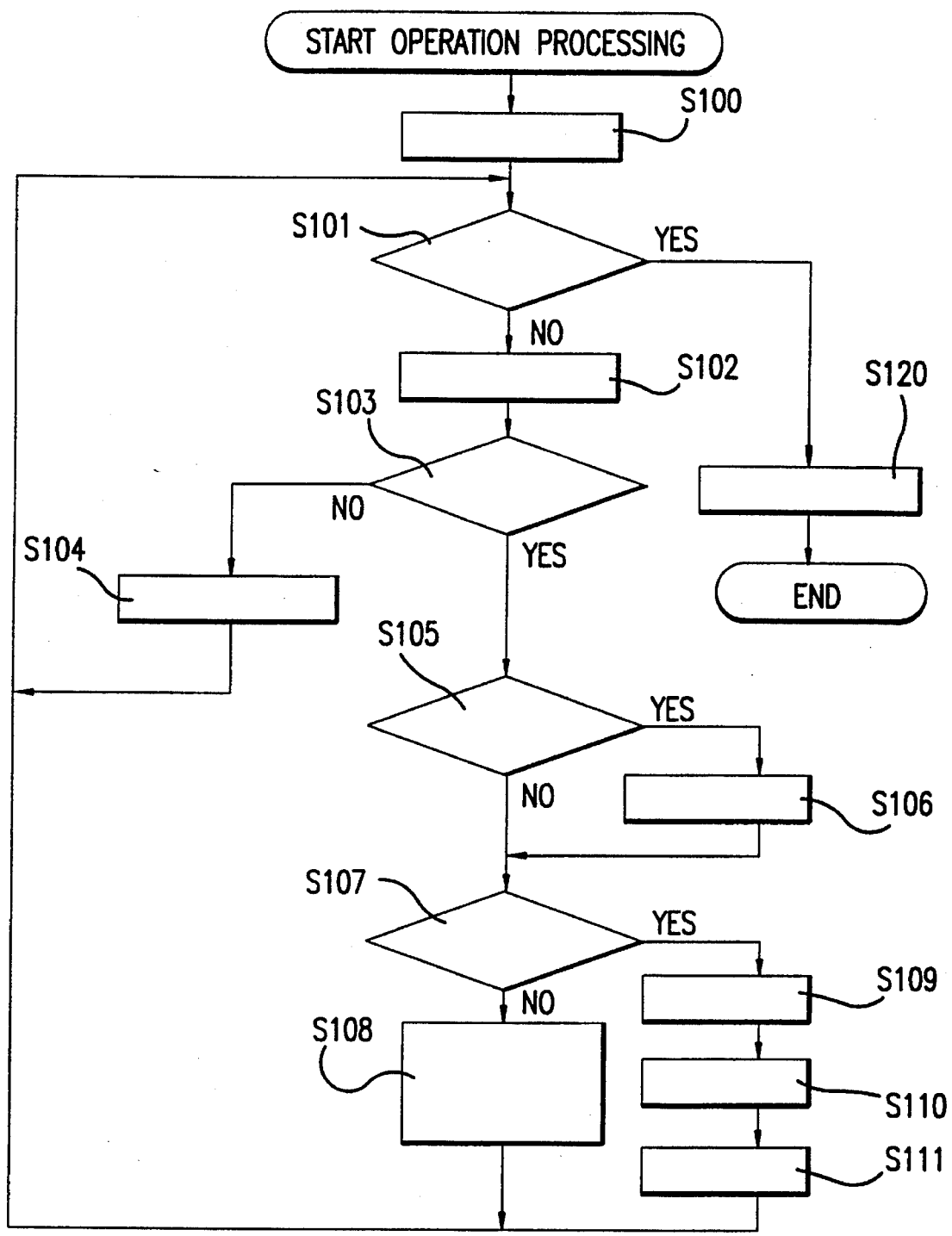

FIGS. 10a and 10b show the flowchart for operating the NC machine tool 300 according to this invention. After the operation processing has started, in step S100, the main computing section 10 stops updating the value of the operation stop timer portion 22f. Then, in step S101, control determines whether or not a program end command has been executed. If a program end command has been executed, control jumps to step S120. In step S120, the operation stop timer portion 22f is reset to zero and is restarted. Control then continues to end the operation processing.

Otherwise, if the program end command has not been executed, control proceeds to S102. In step S102, the next data block of the NC data is read. Then, in step S103, control determines whether or not the next block of NC data, which was just read, is a measurement command. If the next block of NC data is not a measurement command, control proceeds to step S104. In step S104, the next block of NC data is executed and the part is machined by the NC machine tool 300. Then, control returns to step S101.

However, if the next block of NC data, which was just read, is a measurement command, control jumps S105. In step S105, the value of the operation stop timer portion 22f is compared with the value stored in the thermal monitor stop time portion 23f. If the value of the operation stop timer portion 22f is not greater than the value of the thermal monitor stop time portion 23f, control jumps directly to step S107. Otherwise, if the value of the operation stop timer portion 22f is greater than the value of the thermal monitor time portion 23f, the NC machine tool has been stopped for a sufficiently long time that the temperature of the NC machine tool 300 has already dropped. Thus, the thermal displacement has changed and the past measurement hysteresis has therefore become unreliable. Accordingly, control proceeds to step S106, where the thermal measurement is initialized. The initialization of the thermal measurement specifically means resetting the information in the reset memory portion 22 to the initial conditions by turning on the power supply again. Then, control again proceeds to step S107.

In step S107, control determines whether or not the remaining skip count in the remaining skip count portion 22*d* is zero. If, in step S107, the value of the remaining skip count portion 22*d* is not zero, the measurement command is skipped, and control proceeds to step S108. In step S108, the value of the measurement command count portion 22*b* is incremented by one, the value of the remaining skip count portion 22*d* is decremented by one, and the estimated change in thermal displacement $\Delta\epsilon$ stored in the estimated thermal displacement portion 22*h* is added to the total thermal displacement $\delta$ stored in the total thermal displacement portion 22*e*. Then, control again returns to step S101. The addition of the estimated change in thermal displacement $\Delta\epsilon$ stored in the estimated thermal displacement portion 22*h* to the total thermal displacement $\delta$ stored in the total thermal displacement portion 22*e* allows the NC data to be corrected based on the past thermal displacement data, even when the measurement movement is skipped.

However, if, in step S107, the value of the remaining skip count portion 22*d* is zero, control jumps to S109. In step S109, the measurement movement of the tool 352 to the detector mount position 23*g* and the displacement measurement correction process are executed. In the preferred embodiment described above, the skipped count is reset to be equal to the skip count after the measurement movement command is executed and the skip count possibly updated. In this case, the skipped count is decremented from the skip count by one for each skipped measurement movement command, and the measurement movement command is executed when the skipped count is zero. Alternately, the skipped count can be reset to zero after the measurement movement command is executed. In this case, the skipped count is incremented from zero by one for each skipped measurement movement command, and the measurement movement command is executed when the skipped count is equal to the skip count. It should be appreciated that these alternatives are equivalent, and can be interchangeably used in the position correction device of this invention.

Then, control proceeds to step S110, where the measurement hysteresis data table 22*g*, as shown in FIG. 4, is updated based on the measurement data just generated. Then, control proceeds to step S111. In step S111, the value of the monitor count portion 22*c* is possibly updated, based on the current monitor count value and the estimated change in thermal displacement $\Delta\epsilon$ stored in the estimated thermal displacement portion 22*h*. Then, control again returns to step S101.

Step S109 will now be described in more detail. In step S109, the main computing section 10 first adds one to the value of the measurement command count portion 22*b* and the measurement execution count portion 22*a*. Then, the CPU 10*a* generates a command to the motor control section 40 to move the tool 352 until the tool 352 comes into contact with the detector 60. That is, a measurement movement is performed. Based on this contact, the actual total thermal displacement $\delta$ of the tool 352 of the NC machine tool 300 is measured according to the information stored in the position information memory 21 and the value of the detector mount position portion 23*g*. Then, the displacement thus measured is stored in the total thermal displacement portion 22*e*. Based on this measured total thermal displacement $\delta$ stored in the total thermal displacement portion 22*e*, the correction amount B stored in the pitch error correction memory 70*b* is updated and the information stored in the position information 21 is corrected. Then, the skipped count is reset to zero, or alternatively, to the skip count.

Figure 11A:
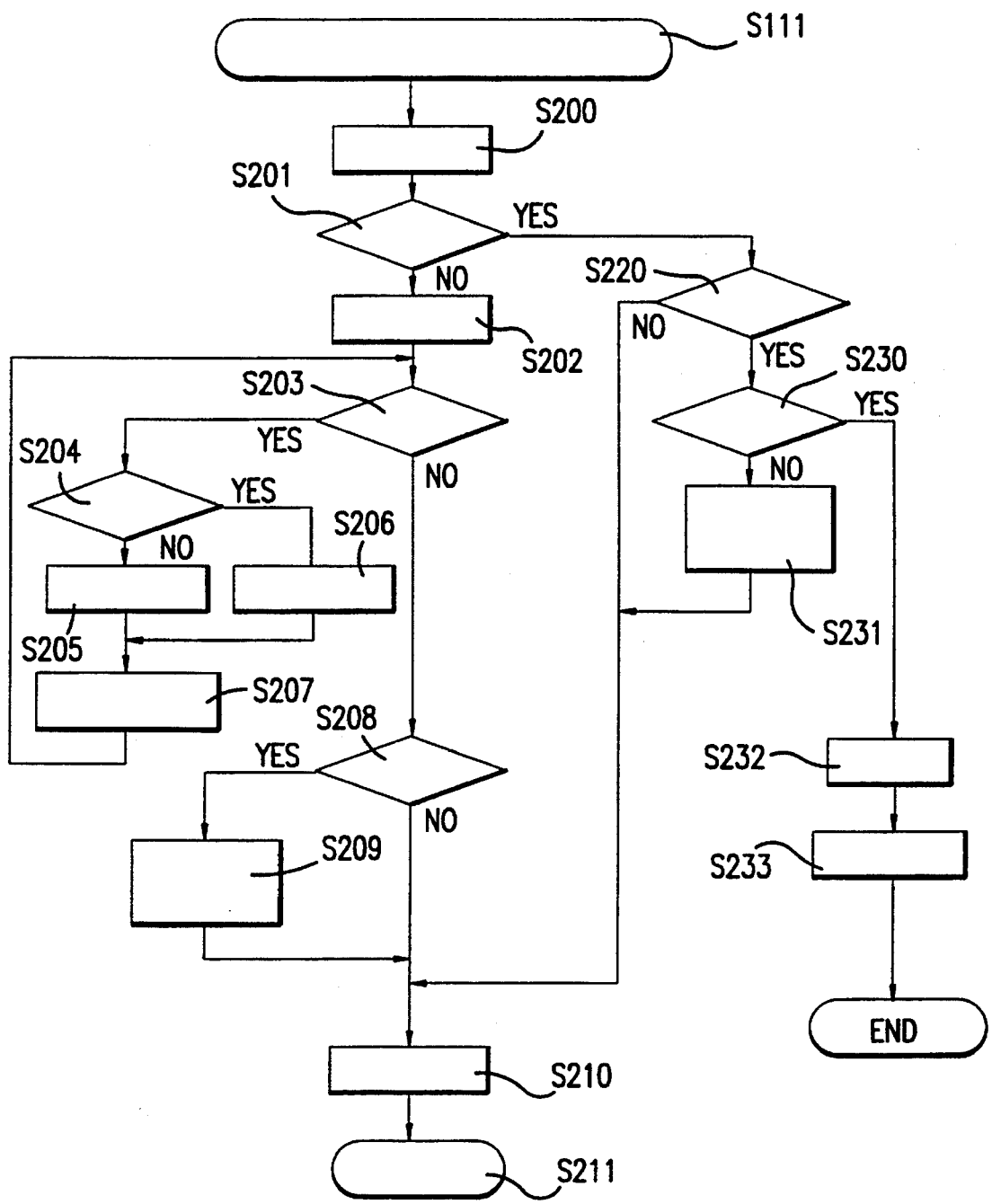

FIGS. 11*a* and 11*b* show the monitor count determination of step S111 in greater detail. In step S200, the estimated change in thermal displacement $\Delta\epsilon$ stored in the estimated thermal displacement portion 22*h* is determined. That is, the average thermal displacement is obtained by dividing the actual change in total thermal displacement $\epsilon$ (i.e. the difference between the previous actual total thermal displacement $\delta$ and the current total thermal displacement $\delta$ stored in the thermal displacement portion 22*e*) by the current monitor count x stored in the monitor count portion 22*c*. The value obtained is stored in the estimated thermal displacement portion 22*h*. Then, in step S201, the actual change in total thermal displacement $\epsilon$ is compared with the thermal monitor displacement value stored in the thermal monitor displacement portion 23*c*.

If, in step S201, the actual change in total thermal displacement $\epsilon$ is not greater than the thermal monitor displacement value, control proceeds to step S202, where a present value for the measurement command count portion 22*b* is stored to a decision pointer portion 22*z*. For example, when the measurement movement count (M) is 15 and the actual change in thermal displacement ($\epsilon$) is 0.004 mm, as shown in FIG. 13, the present value of 18 of the measurement count stored in the measurement command count portion 22*b* is stored in the decision pointer 22*z*. Then, control proceeds to step S203. In step S203, control determines whether or not a number of updating operations, equal to the value of the thermal monitor continuation count portion 23*d*, have been performed. If, in step S203, the number of updating operations is less than the value of the thermal monitor continuation count portion 23*d*, control proceeds to step S204, and another updating operation is performed.

First, in step S204, a first total thermal displacement $\delta$ is selected. The selected first total thermal displacement $\delta$ corresponds to the measurement command count stored in the decision pointer 22*z* in the measurement hysteresis 22*g*, which is shown in FIG. 13. Then, a second total thermal displacement $\delta$ is selected. The selected second total thermal displacement $\delta$ corresponds to the measurement command count stored in the entry of the measurement hysteresis data table 22*g* pointed to by the value of decision pointer 22*z* minus the updating interval width Cx, where C is the predetermined integer and x is the value of the monitor count portion 22*c*. Then, in step S204, the difference between the first and second total thermal displacements $\delta$ is compared to the thermal monitor displacement value stored in the thermal value displacement portion 23*c*.

In the exemplary measurement hysteresis table 22*g* shown in FIG. 13, the first total thermal displacement $\delta$ corresponding to the measurement command count 18 stored in the decision pointer 22*z* is 0.124. The second total thermal displacement $\delta$ is 0.116, and corresponds to the measurement command count 14, which is the value obtained by subtracting the updating interval width Cx (=4, since C=2 and the monitor count is equal to two, as shown in FIG. 12) from the current value of the decision pointer 22*z*. Accordingly, the difference, 0.008=0.124−0.116, is compared with the value 0.010, which is stored in the thermal monitor displacement portion 23*c*.

If, in step S204, the difference between the first and second total thermal displacements $\delta$ is greater than the value stored in the thermal monitor displacement portion 23*c*, control proceeds to step S205, where a no-update-possible flag (not shown) is set and a update-possible flag (not shown) is reset. However, if, in step S204, the difference between the first and second total thermal displacements $\delta$ is not greater than the value stored in the thermal monitor displacement portion 23c, control jumps to step S206, where the update-possible flag is set. In the above example, the difference 0.008 is not greater than the value 0.010 stored in the thermal monitor displacement portion 23c. Accordingly, the value stored in the monitor count portion 22c can be updated and control proceeds to step S206, where the update possible flag is set. Then, control proceeds to step S207, where the current value stored in the monitor count portion 22c is subtracted from the value stored in the decision pointer 22z. In the example described above, the current value of the decision pointer 22z is 18, and the current value of the monitor count portion is 2. Thus, the current value of the decision pointer 22z is reduced to 16. The effect of reducing the value of the decision pointer 22z is to select the immediately prior updating interval as the current updating interval. Then, control returns to step S203.

In this example, the immediately prior updating interval, and thus the current updating interval for the second pass through steps S203–S207, extends from the measurement count 16, corresponding to the new value for the decision pointer 22z, back to the measurement count 12 (=16−Cx, where Cx=4). For this current updating interval, the first total thermal displacement $\delta$ is 0.120, the second total thermal displacement $\delta$ is 0.110, and the difference is 0.010=0.120−0.110.

Control keeps looping through steps S203–S207 until the loop has been executed a number of times equal to the value of the thermal monitor continuation count portion 23d. Alternately, the loop can be aborted in step S203 any time the no-update-possible flag has been set. Thus, once the loop has been executed the indicated number of times (and/or the no-update possible flag is set), control continues from step S203 to step S208. In step S208, the value of the measurement command count portion 22b is compared to the value of the initial thermal measurement count portion 23a. If, in step S208, the value of the measurement command count portion 22b is less than the value of initial thermal measurement count portion 23a, then the system is still within the initial measurement interval, and no updating is allowed. Thus, control jumps directly to step S210. Otherwise, updating is allowed, and if the update-possible flag is also set, control proceeds to step S209. Otherwise, if the no-update-possible flag is set, control jumps to step S210. In step S209, the monitor count is updated by multiplying the current value of the monitor count portion 22c by a predetermined integer. In the preferred embodiment, the predetermined integer is 2. Thus, in this preferred embodiment, the value of the monitor count portion 22c is doubled when it is updated. However, if the updated value for the monitor count portion 22c is greater than the value for the thermal monitor limit count portion 23e, the updated value of the monitor count portion 22c is set instead to the value of the thermal monitor limit count portion 23e. Then, control again proceeds to step S210, where the value of the monitor count portion 22c minus one is stored in the remaining skip count portion 22d, control then proceeds to step S211, which returns control to step S101.

However, if, in step S201, the absolute value of the actual change in the thermal displacement $\epsilon$ is greater than the value of the thermal monitor displacement portion 23c, control jumps to step S220. For example, if the actual change in the thermal displacement $\epsilon$ is −0.011, corresponding to the value 84 for the measurement command count portion 22b in FIG. 13, control proceeds from step S201 to step S220. In step S220, control determines whether or not the value of the monitor count portion 22c is equal to one (corresponding to the condition where the measurement command is executed every time). If, in step S220, the value of the monitor count portion 22c is one, control jumps back to step S210. However, if, in step S220, the value of the monitor count portion 22c is not equal to one, control jumps to step S230.

In step S230, the absolute value of the actual change in thermal displacement $\epsilon$ is compared to the value of the Z-axis machining accuracy portion 23b. The Z-axis machining accuracy value is a maximum actual change in thermal displacement value below which the actual change in thermal displacement $\epsilon$ between measurement movements must be maintained for machining to be able to continue. Thus, in step S230, the absolute value of the actual change in thermal displacement $\epsilon$ is compared to the value of the Z-axis machining accuracy portion 23b. If the value of the Z-axis machining accuracy portion 23b is not greater than the absolute value of the actual change in thermal displacement $\epsilon$, control continues to step S231. Otherwise, if the absolute value of the change in thermal displacement $\epsilon$ is greater than the value of the Z-axis machining accuracy portion 23b, control continues to step S232.

In step S231, the value of the monitor count portion 22c is reset to one half its current value, to ensure the actual change in thermal displacement $\epsilon$ between measurement movements remains below the Z-axis machining accuracy value. However, if the updated value for the monitor count portion 22c obtained in step S231 by halving the current value generates a value which is less than 1, the updated value of the monitor count portion 22c is set to 1. Further, if the updated value obtained for the monitor count portion 22c in step S231 is not an integer, only the integer portion of the value is used, with the decimal portion being discarded. Then, control again jumps to step S210. Step S231 is performed because the measurement movement should be executed more frequently to avoid a dangerous measurement condition such that there is a possibility that the actual change in the total thermal displacement $\delta$ may become greater than the value for the Z-axis machining accuracy portion 23b.

As set forth above, if the actual change in thermal displacement $\epsilon$ is greater than the value for the z-axis machining accuracy portion 23b, control jumps from step S230 to step S232. This is the case when the value for the measurement command count is 124, as shown in FIG. 13. In this case, the absolute value of the change in thermal displacement $\epsilon$ is 0.21 mm, which is greater than the Z-axis machining accuracy of 0.020 mm. In step S232, the thermal measurement is initialized. Then, a thermal displacement overrun error is generated in step S232, and the operation of the machine tool 300 is stopped.

Figure 14:
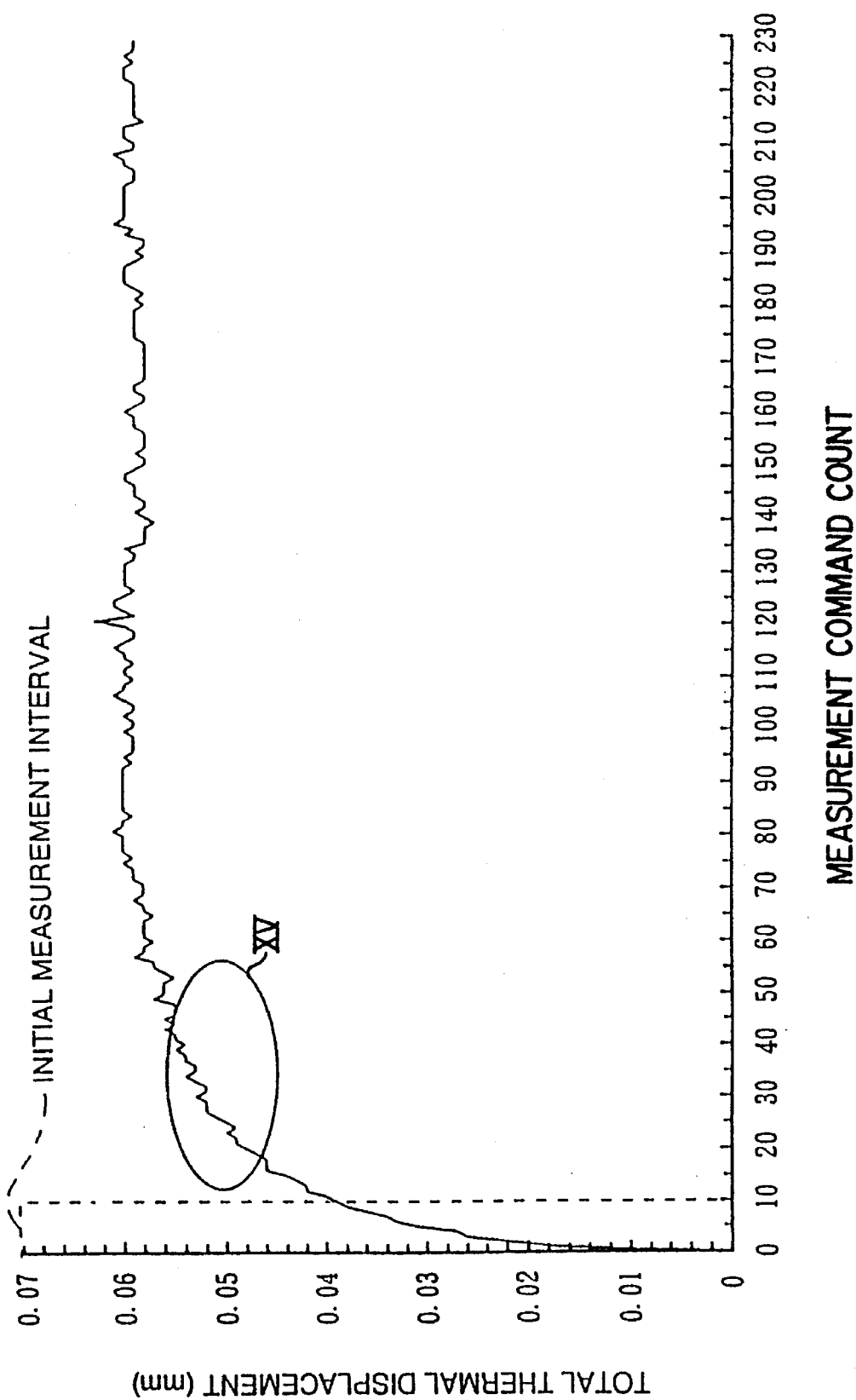
FIG. 14 is another graph of the total thermal displacement as a function of the total number of issued measurement commands.

FIG. 14, like FIG. 5, shows the total change in thermal displacement as a function of the count of issued measurement commands. As in FIG. 5, during an initial measurement interval, the thermal displacement is generally large and unstable. Thereafter, the change in the thermal displacement gradually decreases and becomes stable.

Figure 15:
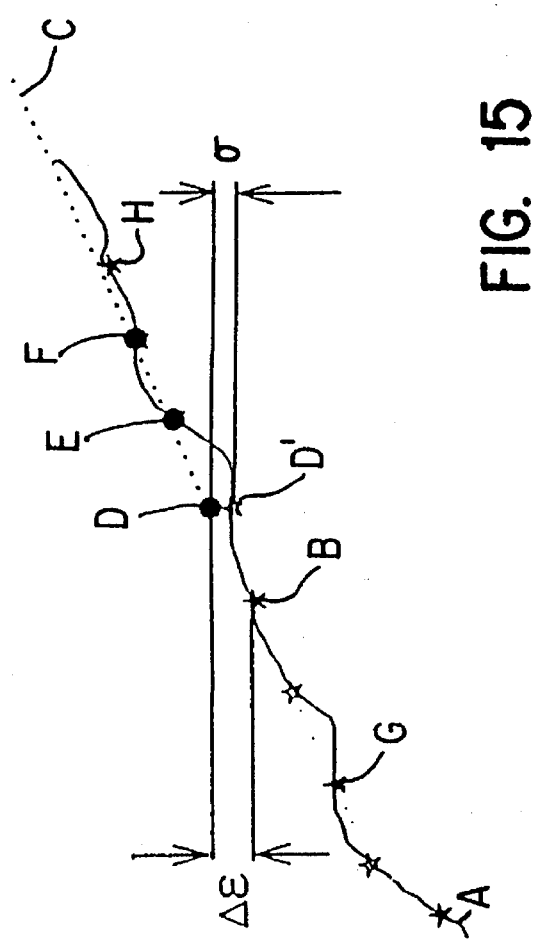
FIG. 15 graphically shows the actual and estimated total displacement values for a number of executed and skipped measurement commands of the graph of FIG. 14.

FIG. 15 shows in greater detail a region of the graph shown in FIG. 14. As shown in FIG. 15, the line A shows the actual thermal displacement. The actual measured displacement values when the measurement movement commands are executed are indicated by the solid stars, and the actual thermal displacements when the measurement movement commands are skipped are indicated by the hollow stars. In addition, as shown in FIG. 15, after a third actual total thermal displacement measurement value B is made in response to an executed measurement command, three estimated total displacement values, as indicated by the solid circles, are determined by adding the estimated change in thermal displacement $\Delta\epsilon$ for each skipped measurement movement command to the measurement value B. As shown by the dashed line C, while the first estimated total displacement value D is displaced from the actual thermal displacement D' by a correction error $\sigma$, the second and third estimated total displacement values E and F generally closely correspond to the actual thermal displacements that would have been measured had the measurement movement command been executed. As shown in FIG. 15, the line C, and thus the estimated change in thermal displacement $\Delta\epsilon$, is determined by placing line C such that it is drawn through the third actual measurement value B and the previous actual measurement value G. In addition, as shown in FIG. 15, the line C comes very close to intersecting the next actual measurement value H. Accordingly, as shown in FIG. 15, while the measurement movement commands corresponding to the estimated total displacement D, E and F are omitted, the actual total thermal displacements corresponding to these skipped measurement movement commands are very accurately represented by repeatedly adding the estimated change in thermal displacement $\Delta\epsilon$ to the third actual measured total thermal displacement measurement value B.

While this invention has been described with reference to the specific embodiments, the description as illustrative is not to be construed as limiting the scope of the invention. Various modification and may occur to those skilled in the art without departing from the spirit and scope of the invention as defined by the appended claims.

What is claimed is:

1. A position data correction device of a machine tool, the device correcting position data based on a determined displacement of a tool of the machine tool from a predetermined origin position, the displacement determined in response to a measurement movement command, the position data correction device comprising:

control means for selectively executing and skipping the measurement movement command;

measurement means for measuring an actual displacement of the tool as the determined displacement in response to an executed measurement movement command;

measurement hysteresis data storing means for storing measurement hysteresis data generated in response to executed measurement movement commands;

determining means for determining, based on the measurement hysteresis data stored in the measurement hysteresis storage means, a skip count indicating a number of measurement movement commands to be skipped; and position correction means for correcting the position data of the machine tool based on the measurement hysteresis data stored in the measurement hysteresis data storage means and the determined skip count;

wherein the control means selectively skips and executes the measurement movement commands based on the skip count.

2. The position data correction device of claim 1, wherein the position correction means comprises estimation means for generating an estimated displacement as the determined displacement in response to a skipped measurement movement command.

3. The position data correction device of claim 2, wherein the measurement hysteresis data comprises actual change in displacement data, actual displacement data, and estimated change in displacement data.

4. The position data correction device of claim 3, wherein the estimation means comprises:

averaging means for determining the estimated change in displacement based on the actual change in displacement for a last executed measurement movement command and the skip count; and addition means for adding the estimated change in displacement to the actual displacement.

5. The position data correction device of claim 1, wherein the measurement means comprises a detector which outputs a contact signal when it is contacted by the tool.

6. The position data correction device of claim 1, wherein determining means comprises:

skip count storage means for storing the skip count; and skipped measurement movement command counting means for storing a count of skipped measurement movement commands since a last executed measurement movement command.

7. The position data correction device of claim 6, wherein the determining means further comprises:

limit storage means for storing a repetition count;

comparing means for comparing previous actual change in displacement values, for a number of previous executed measurement movement commands equal to the repetition count, to the change in displacement limit; and skip count altering means for altering the skip count stored in the skip count storage means based on results from the comparing means.

8. A method for correcting position data based on a determined displacement of a tool of a machine tool from a predetermined origin position, comprising the steps of:

inputting a current command for operating the machine tool;

determining if the current command is a measurement movement command;

comparing a skipped count of skipped measurement movement commands to a first comparison value;

determining, when the current command is a measurement movement command, whether the current command is to be executed, based on results of the comparing step;

if the current command is to be executed,
      performing a measurement movement operation to determine an actual displacement of the tool from the predetermined origin position,
      storing the actual displacement,
      resetting the skipped count to a second comparison value; and
      setting an updated displacement equal to the actual displacement; and correcting the position data based on the updated displacement.

9. The method of claim 8, further comprising, if the measurement movement command is not to be executed, the step of altering the skipped count by 1.

10. The method of claim 8, wherein the first comparison value is one of zero and a skip count of measurement movement commands to be skipped after a measurement movement command is executed, and the second comparison value is the other of the skip count and zero.

11. The method of claim 10, wherein:

the measurement movement operation performing step further comprises determining an actual change in displacement of the tool from the predetermined origin position; and the storing step further comprises the step of storing the actual change in displacement.

12. The method of claim 11, wherein the position correcting step comprises the steps of:
   determining an estimated change in displacement based on the actual change in displacement and the skip count; and
   when the measurement movement command is not to be executed, adding the estimated change in displacement to the updated displacement.

13. The method of claim 11, further comprising the steps of:
   determining if the skip count is greater than 1;
   determining if the actual change in displacement is greater than a maximum change in displacement limit; and
   halting operation of the machine tool if the actual change in displacement is greater than the maximum change in displacement limit.

14. The method of claim 13, wherein the maximum change in displacement limit is a machining accuracy limit.

15. The method of claim 10, further comprising, if the measurement movement command is to be executed, the step of updating the skip count based on a change in displacement limit and at least a current value of the actual change in displacement.

16. The method of claim 15, wherein the skip count updating step comprises the steps of:
   selecting the current value of the actual change in displacement as the selected value of the actual change in displacement;
   determining if the selected value of the actual change in displacement is not greater than the change in displacement limit;
   selecting a previous value of the actual change in displacement as the selected actual change in displacement;
   repeating the determining and previous value selecting steps for a first predetermined number of times; and
   altering the skip count only if the selected actual change in displacement is not greater than the change in displacement limit for each repetition.

17. The method of claim 16, wherein the skip count altering step comprises doubling the skip count.

18. The method of claim 16, further comprising the step of limiting the altered skip count to at most a second predetermined number.

19. The method of claim 16, wherein the skip count altering step comprises increasing the skip count by a second predetermined number.

20. The method of claim 15, wherein the updating step comprises:
   determining if the skip count is greater than 1;
   determining if the actual change in displacement is greater than the change in displacement limit; and
   reducing the skip count if the actual change in displacement is greater than the change in displacement limit.

21. The method of claim 20, wherein the reducing step comprises the steps of:
   dividing the skip count by a predetermined number;
   rounding the divided skip count to the next lowest integer value;
   determining if the rounded skip count is less than 1; and
   setting the skip count to 1 if the rounded skip count is less than 1.

22. The method of claim 21, wherein the dividing step comprises halving the skip count.

23. The method of claim 20, wherein the reducing step comprises the steps of:
   reducing the skip count by a predetermined number;
   determining if the reduced skip count is less than 1; and
   setting the skip count to 1 if the reduced skip count is less than 1.

24. A position data correction device of a machine tool, the position data correction device correcting position data based on a displacement of a tool of the machine tool from a predetermined origin position, the displacement being determined in response to a measurement movement command, the position data correction device comprising:
   a displacement measuring system, which measures an actual displacement in response to an executed measurement movement command;
   a measurement memory which stores measurement data generated in response to executed measurement movement commands; and
   a controller, comprising:
      a skip count system, which determines a skip count value for the number of subsequent measurement movement commands to be skipped in response to the executed measurement command and a skipped count value of the number of skipped measurement movement commands since a last executed measurement movement command,
      a selection system, which selectively executes and skips subsequent measurement movement commands based on the skip count value, and
      a position correction system, which corrects position data of the machine tool based on the measurement data stored in the measurement memory and the current skipped count value.

25. The position data correction device of claim 24, wherein the position correction system comprises an estimating system, which generates an estimated change in displacement in response to the executed measurement command based on the measured actual displacement, a measured change in displacement and the skip count value.

26. The position data correction device of claim 24, wherein the skip count value is 1.

27. The position data correction device of claim 24, wherein the skipped count value is reset to zero upon execution of a measurement movement command, and the skipped count value is incremented by 1 upon each skipped measurement movement command.

* * * * *